United States Patent [19]
Wright

[11] 3,736,005
[45] May 29, 1973

[54] SNOW VEHICLE ATTACHMENT

[75] Inventor: Orval George Wright, Toronto 12, Ontario, Canada

[73] Assignee: Wright Aluminum Limited, Weston, Ontario, Canada

[22] Filed: May 17, 1971

[21] Appl. No.: 144,202

[52] U.S. Cl. ..........................280/150 C, 180/5 R
[51] Int. Cl. ...........................................B62m 27/02
[58] Field of Search ...............280/150 C; 180/5 R

[56] References Cited

UNITED STATES PATENTS

| | | | |
|---|---|---|---|
| 3,502,368 | 3/1970 | Maxa | 280/150 C X |
| 3,622,177 | 11/1971 | Notestine et al. | 280/150 C |
| 3,146,001 | 8/1964 | McFadyen | 280/150 C |
| 3,599,740 | 8/1971 | Martinmaas | 180/5 R |
| 3,622,175 | 11/1971 | Benz | 180/5 R |

FOREIGN PATENTS OR APPLICATIONS

| | | | |
|---|---|---|---|
| 870,490 | 5/1971 | Canada | 180/5 R |
| 1,372,793 | 8/1964 | France | 280/150 C |

Primary Examiner—Leo Friaglia
Attorney—Rogers, Bereskin & Parr

[57] ABSTRACT

This invention provides a safety attachment for snow vehicles of the type having a body and a seat extending longitudinally rearwardly and terminating at a rear end. The attachment comprises first and second end frames extending upwardly in generally parallel relationship. Each of the end frames includes means at its lower end adapted to attachment the end frame to the side of the vehicle body adjacent the rear end and a plurality of rails extend generally horizontally between the end frames. A back rest is coupled to the end frames and positioned so that when the attachment is coupled to the vehicle the back is positioned relative to the seat such that a passenger sitting on the seat is supported by the back rest.

1 Claim, 3 Drawing Figures

Patented May 29, 1973

INVENTOR.
ORVAL GEORGE WRIGHT

BY Rogers, Bereskin & Parr

INVENTOR.
ORVAL GEORGE WRIGHT

BY
Rogers, Bereskin & Parr

SNOW VEHICLE ATTACHMENT

This invention relates to a safety attachment for snow vehicles.

Snow vehicles are becoming increasingly popular for pleasure driving over snow, ice and the like. The vehicles consist essentially of a motor driving a single continuous track and a pair of skis in front of the track and coupled to a handlebar steering. A seat is provided above the track for the driver and one or more passengers. Because of the conditions in which the vehicles are used, there is some difficulty in stopping the vehicles and steering them accurately. This is particularly true on ice where the vehicle's inertia tends to keep the vehicle in a straight line. Should the vehicle be heading for an obstacle at high speed on ice there is a distinct possibility that the driver will neither be able to steer the vehicle around the obstacle or to stop. As a result care must be exercised in driving the vehicles. However, because of the lack of skill of drivers and the power used in the vehicles, accidents are becoming more common.

There are three major types of accidents prevalent among snow vehicle users. First of all the vehicle tends to roll over when travelling transversely along inclines; secondly rear end collisions caused by drivers losing control on ice; and thirdly passengers falling off the rear of the machine into the path of other vehicles because of the lack of springing and hard suspensions used in the vehicles. A fourth problem is the possibility or running out of fuel in cold wintry conditions resulting in the driver having to walk over snow fit only for snow shoes or snow vehicles.

It is an object of the present invention to provide an attachment for snow vehicles for protecting and supporting passengers from roll over and rear end collisions, and also to limit the possibility of passengers falling off the back of the vehicle.

It is a further object of the invention to provide an attachment for snow vehicles suitable for carrying supplies such as foodstuffs and spare fuel for emergencies in wintry conditions.

According to a particular preferred embodiment of the present invention, a safety attachment for a snow vehicle is provided, the snow vehicle being of the type having a body and a seat extending longitudinally rearwardly and terminating at a rear end. The attachment includes first and second end frames extending upwardly in generally parallel relationship, and each of the end frames includes means at its lower end adapted to attach the end frame to the vehicle body. A plurality of rails extend generally horizontally between the end frames and are attached to the end frames whereby the frames are spaced apart. The back rest is coupled to the end frames so that when the attachment is fastened to the vehicle, the back rest is positioned relative to the seats so that a passenger sitting on the seat is supported by the back rest.

The invention will be better understood with reference to the drawings, wherein.

Figure 1:
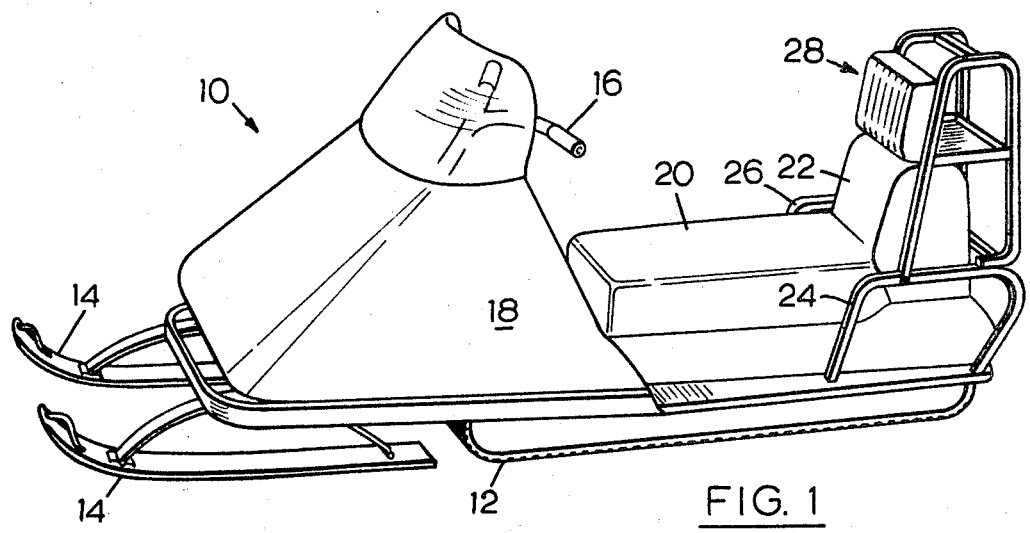
FIG. 1 is a perspective view of a snow vehicle on which is mounted an attachment according to the invention.

Reference is first made to FIG. 1 which shows a snow vehicle 10 having a driven track 12 and a pair of skis 14 coupled to handlebars 16 for steering the vehicle. A cover 18 protects an engine (not shown) which drives the track 12 and a seat 20 is provided above the track for a driver and one or more passengers. Seat 20 terminates at its rear end in an upholstered upright portion 22 for supporting the lower part of a passenger's back, and hand rails 24, 26 are provided one at each side of the upright portion 22 for use by a passenger in holding onto the vehicle 10. An attachment 28 according to the invention is attached to the hand rails 24, 26.

Figure 2:
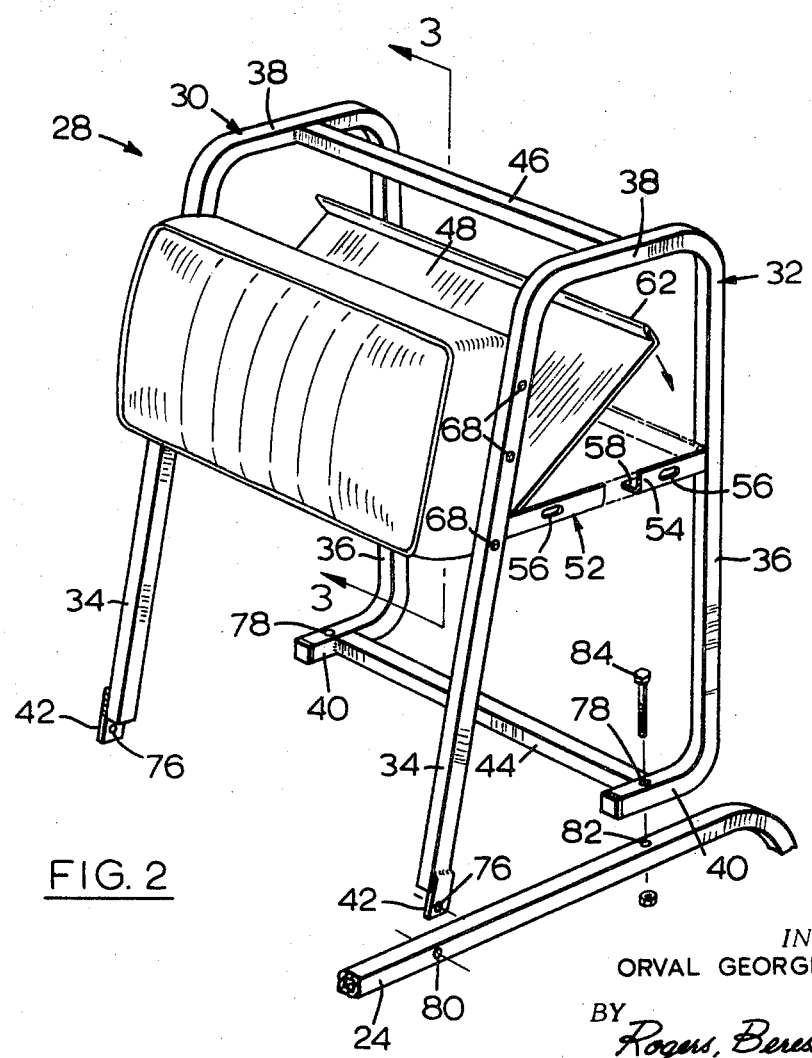
FIG. 2 is a perspective view of the attachment.
Figure 3:
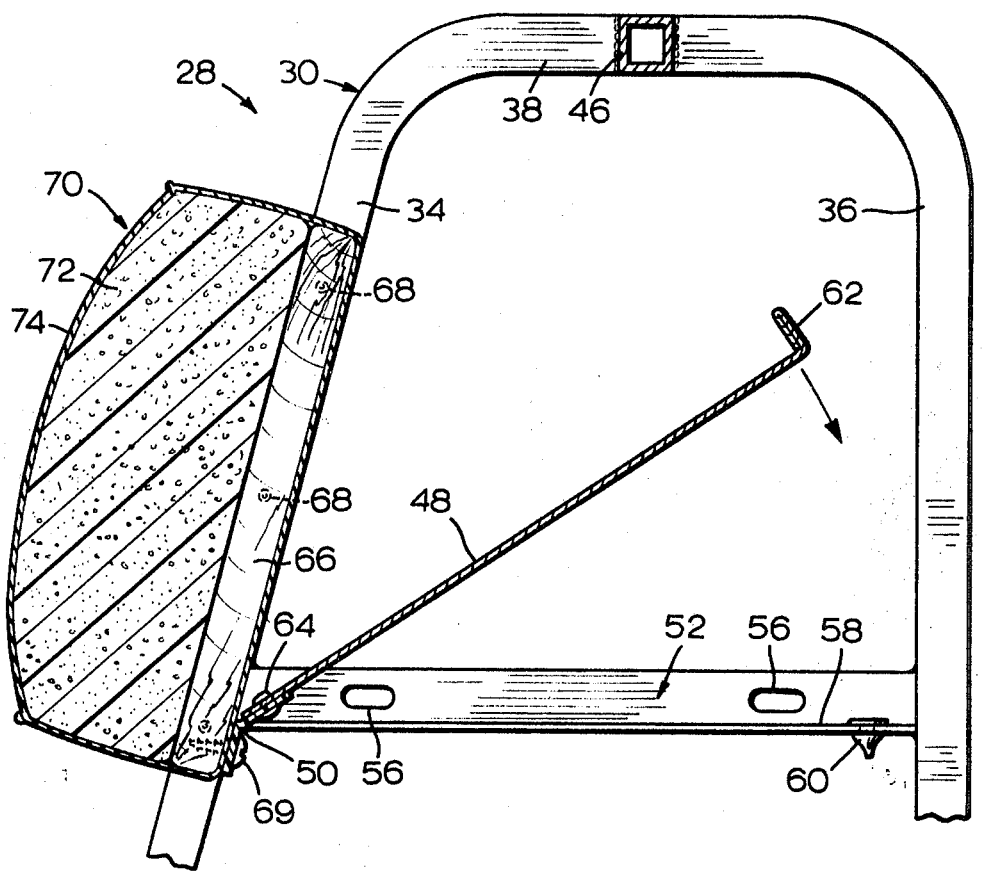
FIG. 3 is a sectional side view on lines 3—3 of FIG. 2.

Reference is next made to FIGS. 2 and 3 with particular reference to FIG. 2 to describe the attachment 28. The attachment is formed from a pair of end frames 30, 32 each of which has respective front and rear sections 34, 36 which converge upwardly to blend into a top section 38. The lower end of section 36 curves into an attachment section 40 and the lower end of section 34 has a lug 42 welded to its outer face for engaging with an outer face of rail 24. Attachment sections 40 are spaced apart by a lower rail 44 such that the sections 40 register on top of respective rails 24, 26. A top rail 46 is welded at its ends to inwardly facing sides of the frames 30, 32 to further rigidify the structure.

The attachment 28 optionally includes a hinged tray 48 which is movable upwardly about a hinge 50 at its forward extremity to provide access to a fuel tank at the rear of the vehicle. In the normal position, the tray 48 rests on a pair of angle members 52 each of which extends generally horizontally between sections 34, 36. Angle member 52 consists of an upright portion 54 in which openings 56 are provided for straps to hold objects on the tray 48. Member 52 also includes a horizontal portion 58 having a rubber buffer or stop 60 engaged in it for supporting tray 48.

The hinged tray 48 is generally rectangular and is formed of sheet metal and the like having an outer upright projection 62 for retaining articles on the tray. Hinge 50 is attached to the leading end of the tray 48 by rivets 64, the hinge being of plastic or any suitable flexible material such as leather and the like. A support member 66 of wood or the like extends between front sections 34 and is held in place by screws 68 which pass through sections 34. The support member 66 extends slightly below the angle member 52 for receiving wood screws 69 to attach the hinge 50. A padded back rest 70 extends forwardly from the support member 66 and consists of a cushion material 72 contained together with support member 66 in a skin 74 of a material to match the upholstery of the snow vehicle 10 (FIG. 1).

Attachment 28 has respective holes 76, 78 in lug 42 and attachment section 40. The holes are adapted to align with similar holes 80, 82 in respective rails 24, 26 for receiving fasteners 84 (one of which is shown).

The frames 30, 32 and rails 44, 46 are preferably of square-sectioned tubing similar to that used for the handrails 24, 26. However, it will be appreciated that snow vehicles vary in construction and that the proportions of the frames 30, 32 and rails 44, 46 can be varied for attachment to a particular brand of snow vehicle. Similarly, the fasteners 84 can be arranged differently depending upon whether the vehicle has hand rails or whether the attachment must be coupled directly to the body of the vehicle. Similarly, the position of the tray 48 (if one is included) may be varied although the back rest 70 is preferably positioned above the upright portion 22, (FIG. 1) in a position for supporting a passenger's back.

In use, a can of extra fuel, foodstuffs, fishing tackle and the like can be strapped to the tray 48. If the vehicle should roll over the seat 20 is unlikely to trap the riders because the vehicle will rest on the attachment 28 and handlebars 16. Also, in rear end collisions, the attachment provides added protection against skis from another vehicle riding over seat 20 and impaling passengers on the vehicle 10.

I claim:

1. A safety attachment for a snow vehicle, the vehicle having a body and a seat extending longitudinally rearwardly and terminating at a rear end, the attachment comprising: first and second end frames extending upwardly in generally parallel relationship, each said end frame including means at its lower end adapted to attach the end frame to a side of the vehicle body adjacent said rear end; a plurality of rails extending generally horizontally between said end frames and attached to the end frames whereby the frames are spaced apart for positioning at respective sides of the seat; a back rest coupled to the end frames so that when the attachment is connected to the vehicle, the back rest is positioned relative to the seat such that a passenger sitting on the seat is supported by the back rest; a tray coupled to the end frames and extending generally horizontally for supporting luggage and the like, the tray being hinged at its forward extremity for rotating the tray upwardly; and means coupled to the end frames for supporting the tray in a substantially horizontal position.

* * * * *